(12) United States Patent
Pollmann (10) Patent No.: US 10,581,633 B2
(45) Date of Patent: Mar. 3, 2020

(54) AUTOMATION DEVICE FOR THE REDUNDANT CONTROL OF A BUS SUBSCRIBER

(71) Applicant: Phoenix Contact GmbH & Co. KG, Blomberg (DE)

(72) Inventor: Jan Pollmann, Steinhelm (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 466 days.

(21) Appl. No.: 15/099,776

(22) Filed: Apr. 15, 2016

(65) Prior Publication Data
US 2016/0308651 A1 Oct. 20, 2016

(30) Foreign Application Priority Data
Apr. 17, 2015 (DE) ......................... 10 2015 105 929

(51) Int. Cl.
*H04L 12/40* (2006.01)
*G05B 9/03* (2006.01)

(52) U.S. Cl.
CPC .. *H04L 12/40189* (2013.01); *H04L 12/40176* (2013.01); *G05B 9/03* (2013.01); *H04L 2012/4026* (2013.01)

(58) Field of Classification Search
CPC ....... H04L 49/15; H04L 49/30; H04L 49/351; H04L 12/462; H04L 12/40189; H04L 12/40182; H04L 12/40195
See application file for complete search history.

(56) References Cited

U.S. PATENT DOCUMENTS

| 2011/0191500 A1* | 8/2011 | Odayappan | ........ G05B 19/0426 710/8 |
| 2011/0205918 A1* | 8/2011 | Hurwitz | ................. H04B 3/542 370/252 |

(Continued)

FOREIGN PATENT DOCUMENTS

| CN | 102622279 A | 8/2012 |
| DE | 10 2004 041 824 B4 | 2/2008 |

(Continued)

*Primary Examiner* — Redentor Pasia
(74) *Attorney, Agent, or Firm* — Holland & Hart LLP (57) ABSTRACT

An automation device for the redundant control of a bus subscriber, including: a bus interface for communication with the bus subscriber; a first communication interface for communication with a first controller via a first communication network; a second communication interface for communication with the second controller via a second communication network; and a processor. The processor transmits bus data received from the bus interface to the first communication interface and to the second communication interface. The first communication interface transmits the received bus data to the first controller, the second communication interface transmits the received bus data to the second controller, and the first communication interface and the second communication interface are communicatively separated. The processor also transmits first communication data received via the first communication interface and second communication data received via the second communication interface to the bus subscriber via the bus interface.

14 Claims, 6 Drawing Sheets

(56) References Cited

U.S. PATENT DOCUMENTS

2011/0310859 A1* 12/2011 Vedantham ....... H04W 72/1263
  370/336
2013/0103877 A1* 4/2013 Burr .................... G05B 19/042
  710/315
2013/0332633 A1* 12/2013 Carney ............... G06F 13/4291
  710/48

FOREIGN PATENT DOCUMENTS

| | | |
|---|---|---|
| DE | 10 2008 038 131 B4 | 3/2010 |
| DE | 10 2010 015 455 B4 | 10/2011 |
| WO | WO 2014/166949 A1 | 10/2014 |

* cited by examiner

AUTOMATION DEVICE FOR THE REDUNDANT CONTROL OF A BUS SUBSCRIBER

CROSS-REFERENCE TO RELATED APPLICATION

The present application claims priority to German patent application No. 10 2015 105 929.0, entitled "Automatisierungsgerät zum redundanten Steuern eines Busteilnehmers," which was filed on Apr. 17, 2015 and is assigned to the assignee hereof.

BACKGROUND

In automation technology and in control systems in shipbuilding, a bus subscriber, such as an actuator or sensor, is frequently controlled in a redundant manner. For the redundant control of the bus subscriber, systems with at least two controllers and an automation device are frequently used, wherein the bus subscriber has a communication connection via a bus connection to the automation device and the automation device has a communication connection via communication networks to the controllers.

Document DE 10 2010 015 455 B4 describes an automation device with redundantly designed network interfaces for connection to a fieldbus, wherein the automation device has a fieldbus controller with a single MAC address and a network distributor connected to the fieldbus controller, wherein the network distributor is designed as an Ethernet switch and the automation device is configured to emulate individual MAC addresses for the at least two network interfaces in order to convert the different MAC addresses to the MAC address of the common fieldbus controller, and wherein the network distributor is configured to provide the plurality of network interfaces in each case with individual network addresses depending on the individual MAC addresses.

SUMMARY

The present disclosure is directed to a more efficient and economical way to provide redundant control of a bus subscriber.

An automation device for redundant control of a bus subscriber using a first controller and a second controller is disclosed. The automation device includes a bus interface for communication with the bus subscriber, a first communication interface for communication with the first controller via a first communication network, a second communication interface for communication with the second controller via a second communication network, and a processor configured to transmit bus data received from the bus interface to the first communication interface and the second communication interface. The first communication interface is configured to transmit the received bus data to the first controller, the second communication interface is configured to transmit the received bus data to the second controller, and the first communication interface and the second communication interface are communicatively separated. The processor is configured to transmit first communication data received via the first communication interface and second communication data received via the second communication interface to the bus subscriber via the bus interface.

BRIEF DESCRIPTION OF THE DRAWINGS

A further understanding of the nature and advantages of the present disclosure may be realized by reference to the following drawings.

DETAILED DESCRIPTION

The underlying object of the present disclosure is to produce a more efficient and more economical concept for the redundant control of a bus subscriber.

This object is achieved by subject-matters with the features according to the independent claim and according to the subsidiary claim. Examples of these principles are the subject-matter of the figures, the description and the dependent claims.

According to a first example, the object is achieved by an automation device for the redundant control of a bus subscriber by means of a first controller and a second controller, with: a bus interface for communication with the bus subscriber; a first communication interface for communication with the first controller via a first communication network; a second communication interface for communication with the second controller via a second communication network; and a processor, wherein the processor is configured to transmit bus data received from the bus interface to the first communication interface and to the second communication interface; wherein the first communication interface is configured to transmit the received bus data to the first controller, wherein the second communication interface is configured to transmit the received bus data to the second controller, and wherein the first communication interface and the second communication interface are communicatively separated; and wherein the processor is configured to transmit first communication data received via the first communication interface and second communication data received via the second communication interface to the bus subscriber via the bus interface. The advantage is thereby achieved that a complex emulation of network addresses or MAC addresses for the respective communication interfaces can be avoided. Furthermore, a high-cost network distributor, such as an Ethernet switch, can be dispensed with. A plurality of bus subscribers can furthermore be redundantly controlled by means of the automation device. The plurality is, for example, 2, 3, 4, 5, 10, 15, 20, 25 or 30.

The automation device may be a bus coupler which establishes a connection to the bus subscriber. The automation device may furthermore be a secondary controller, for example an in-line controller (ILC) or an axiocontrol (AXC). The bus subscriber may furthermore be an input/output module, such as an I/O module to which a sensor or an actuator can be connected. The automation device and the bus subscriber may furthermore form a remote I/O station. The bus subscriber may furthermore be a controllable actuator or sensor with a bus interface.

The respective controller may be a programmable logic controller (PLC). The respective controller may furthermore have a user interface for controlling the bus subscriber. For example, the first controller is a primary controller and the second controller is a secondary controller or a backup controller. Furthermore, the respective controllers may have communication interfaces for communication via the respective communication network. According to one embodiment, the respective controllers may be combined into one control unit.

The bus interface may be a serial bus interface, a parallel bus interface, a backplane bus interface, in particular a serial backplane bus interface, an Interbus interface, a Profibus interface or a Controller Area Network bus interface.

The respective communication interface may comprise a serial interface, a parallel interface, an Ethernet communication interface and/or a Wireless Local Area Network communication interface. The respective communication network may furthermore be a computer network, an Ethernet network or an Internet Protocol network. The respective communication network may furthermore have a ring topology, a line topology or a star topology.

The processor may furthermore serve as a converter between the bus subscriber and the respective controller. The bus data may furthermore comprise data transmitted by the bus subscriber, such as input process data. The respective communication data may furthermore comprise data transmitted by the respective controller, such as output process data.

A redundant control of the bus subscriber can be enabled due to the redundant connection of the respective controllers to the automation device. For example, the first controller is a primary controller and the second controller a backup controller. In the event of a failure of the first communication network, for example due to a cable break, a power failure or network overload, or in the event of a malfunction of the first controller, the bus subscriber can still be controlled here by means of the second controller. The switchover from the first controller to the second controller can be carried out in an automated manner. To do this, the first controller and the second controller may have a communication connection and may be configured to exchange status information relating to the control of the bus subscriber. According to one embodiment, the switchover from the first controller to the second controller can furthermore be carried out manually by a user of the respective controllers, for example by means of user interfaces of the respective controllers.

In one advantageous embodiment of the automation device, the first communication interface and the second communication interface are configured to transmit the received bus data simultaneously to the first controller and to the second controller. The advantage is thereby achieved that the bus subscriber can be controlled simultaneously with both controllers.

In a further advantageous embodiment of the automation device, a first MAC address is permanently allocated to the first communication interface and the first communication interface is configured for communication via the first communication network using the first MAC address, and/or a second MAC address is permanently allocated to the second communication interface, and the second communication interface is configured for communication via the second communication network using the second MAC address. The advantage is thereby achieved that a complex emulation or conversion of MAC addresses can be dispensed with. The respective MAC addresses may be Media Access Control addresses.

In a further advantageous embodiment of the automation device, the first communication interface comprises a first network interface for communication via the first communication network and a first network controller to control the first network interface, and/or the second communication interface comprises a second network interface for communication via the second communication network and a second network controller to control the second network interface. The advantage is thereby achieved that the communication via the respective communication network can be controlled efficiently and economically. The respective network interface may be an Ethernet communication interface. The respective network controller may furthermore be an Ethernet controller.

In a further advantageous embodiment of the automation device, the first communication interface comprises a plurality of first network interfaces for communication via the first communication network and a first network distributor to control the plurality of first network interfaces, and/or the second communication interface comprises a plurality of second network interfaces for communication via the second communication network and a second network distributor to control the plurality of second network interfaces. The advantage is thereby achieved that the communication connection of the respective communication interface to the respective communication network can be configured redundantly. The respective communication interface can furthermore be integrated without an external network distributor, such as a switch, into two separate distributed line or ring topologies. As a result, a cost reduction can be achieved and a cabling outlay can be reduced. The plurality may be 2, 3, 4, 5, 6, 7, 8, 9 or 10. The respective network distributor may furthermore be formed by a switch.

In a further advantageous embodiment of the automation device, the first communication interface comprises an Ethernet communication interface, and/or the second communication interface comprises an Ethernet communication interface. The advantage is thereby achieved that the automation device can be manufactured particularly economically through the use of a standardized communication interface.

In a further advantageous embodiment of the automation device, the automation device is configured with a bus controller to control the bus interface. The advantage is thereby achieved that a lower-cost processor can be used.

In a further advantageous embodiment of the automation device, the bus interface is a backplane bus interface. The advantage is thereby achieved that the automation device can be manufactured particularly economically through the use of a standardized bus interface.

According to a second example, the object is achieved by a system for the redundant control of a bus subscriber, with: the automation device described above being connectable via the bus interface to the bus subscriber; a first controller to control the bus subscriber, wherein the first controller has a third communication interface for communication with the first communication interface of the automation device via the first communication network; and a second controller to control the bus subscriber, wherein the second controller has a fourth communication interface for communication with the second communication interface of the automation device via the second communication network. The advantage is thereby achieved that the bus subscriber can be redundantly controlled in an efficient and economical manner.

The bus subscriber may be an input/output module, such as an I/O module to which a sensor or an actuator can be connected. The bus subscriber may furthermore be a controllable actuator or sensor with a bus interface. For example, the bus interface is a backplane bus interface. The respective communication interface may comprise a serial interface, a parallel interface, an Ethernet communication interface and/or a Wireless Local Area Network communication interface. The respective communication network may furthermore be a computer network, an Ethernet network or an Internet Protocol network. The respective communication network may furthermore have a ring topology, a line topology or a star topology.

The respective controller may be a programmable logic controller. The respective controller may furthermore have a user interface for controlling the bus subscriber. For example, the first controller is a primary controller and the second controller is a secondary controller or a backup controller. According to one embodiment, the respective controllers may be combined into one control unit.

In one advantageous embodiment of the system, the first communication interface and the third communication interface and/or the second communication interface and the fourth communication interface are Ethernet communication interfaces. The advantage is thereby achieved that a particularly economical integration of the respective controller into a line or ring topology can be achieved.

In a further advantageous embodiment of the system, the first communication interface and the third communication interface and/or the second communication interface and the fourth communication interface are configured to communicate using the Internet Protocol. The advantage is thereby achieved that a standardized communication protocol can be used.

In a further advantageous embodiment of the system, the first controller and the second controller are communicatively connected to each other and the first controller and the second controller are configured to exchange status information relating to the control of the bus subscriber. The advantage is thereby achieved that a synchronization of the respective controllers with one another can be enabled. For example, the automation device receives second communication data from the second controller only if the first controller has failed.

In a further advantageous embodiment of the system, the first controller is configured to detect a communication error in the communication between the first controller and the automation device, the first controller is furthermore configured to transmit a notification of the detection of the communication error to the second controller in response to the detection of the communication error and the second controller is configured to control the bus subscriber in response to receiving the notification of the detection of the communication error. The advantage is thereby achieved that an automated switchover from the first controller to the second controller can be implemented in the event of a communication error in the communication between the first controller and the automation device. The communication error in the communication between the first controller and the automation device may be caused by a failure of the first communication network. For example, the first communication network fails due to a cable break, due to a power failure or due to network overload.

Figure 1:
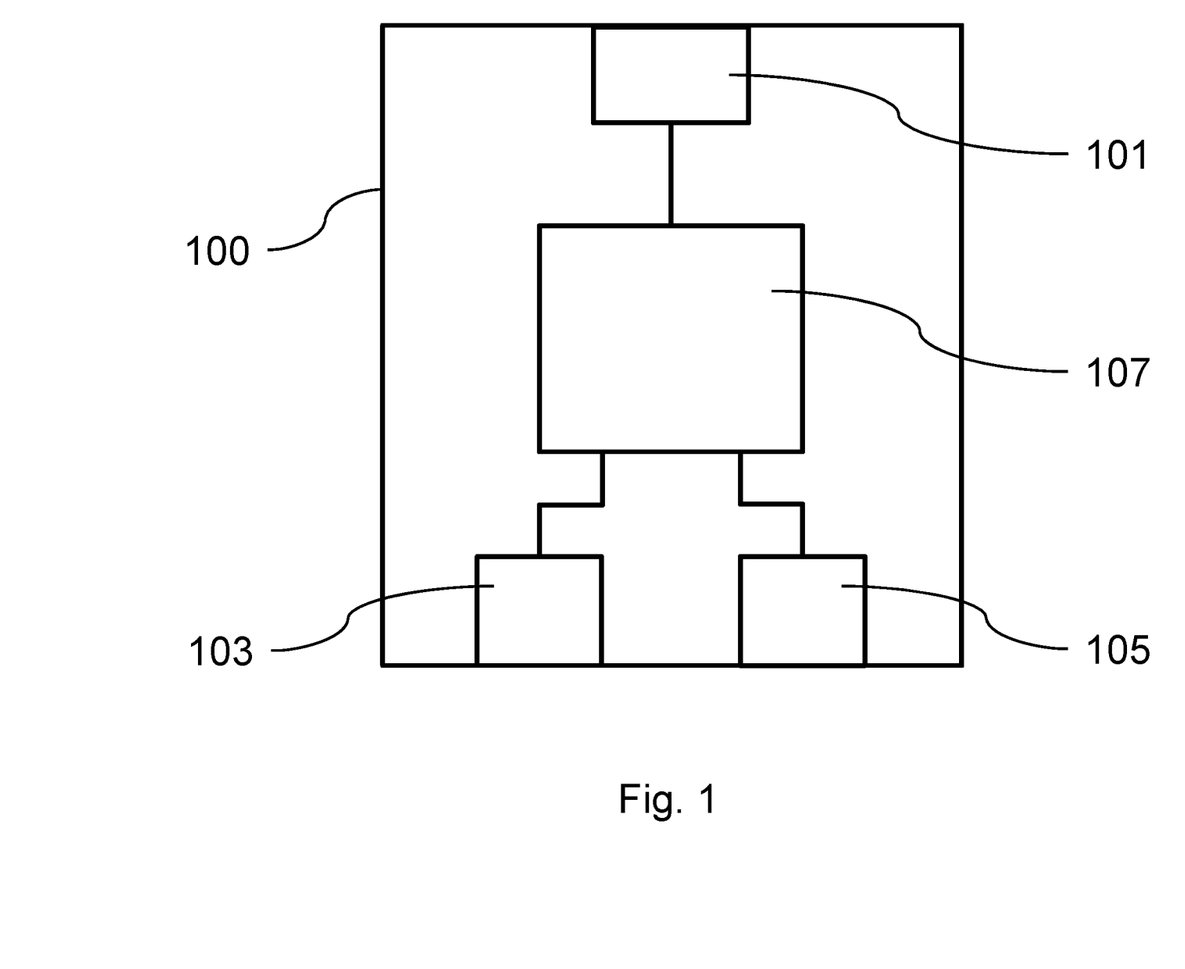
FIG. 1 shows a schematic diagram of an automation device according to one embodiment.

FIG. 1 shows a schematic diagram of an automation device 100 according to one embodiment. The automation device 100 comprises a bus interface 101, a first communication interface 103, a second communication interface 105 and a processor 107.

The automation device 100 for the redundant control of a bus subscriber by means of a first controller and a second controller is configured with: the bus interface 101 for communication with the bus subscriber; the first communication interface 103 for communication with the first controller via a first communication network; the second communication interface 105 for communication with the second controller via a second communication network; and the processor 107, wherein the processor 107 is configured to transmit bus data received from the bus interface 101 to the first communication interface 103 and to the second communication interface 105; wherein the first communication interface 103 is configured to transmit the received bus data to the first controller, wherein the second communication interface 105 is configured to transmit the received bus data to the second controller, and wherein the first communication interface 103 and the second communication interface 105 are communicatively separated; and wherein the processor 107 is configured to transmit first communication data received via the first communication interface 103 and second communication data received via the second communication interface 105 to the bus subscriber via the bus interface 101.

A plurality of bus subscribers can furthermore be redundantly controlled by means of the automation device 100. The plurality is, for example, 2, 3, 4, 5, 10, 15, 20, 25 or 30.

The automation device 100 may be a bus coupler which establishes a connection to the bus subscriber. The automation device 100 may furthermore be a secondary controller, for example an in-line controller (ILC) or an axiocontrol (AXC). The bus subscriber may furthermore be an input/output module, such as an I/O module to which a sensor or an actuator can be connected. The automation device 100 and the bus subscriber may furthermore form a remote I/O station. The bus subscriber may furthermore be a controllable actuator or sensor with a bus interface.

The respective controller may be a programmable logic controller (PLC). The respective controller may furthermore have a user interface for controlling the bus subscriber. For example, the first controller is a primary controller and the second controller is a secondary controller or a backup controller. Furthermore, the respective controllers may have communication interfaces for communication via the respective communication network. According to one embodiment, the respective controllers may be combined into one control unit.

The bus interface 101 may be a serial bus interface, a parallel bus interface, a backplane bus interface, in particular a serial backplane bus interface, an Interbus interface, a Profibus interface or a Controller Area Network bus interface.

The respective communication interface 103, 105 may comprise a serial interface, a parallel interface, an Ethernet communication interface and/or a Wireless Local Area Network communication interface. The respective communication network may furthermore be a computer network, an Ethernet network or an Internet Protocol network. The respective communication network may furthermore have a ring topology, a line topology or a star topology.

The processor 107 may furthermore serve as a converter between the bus subscriber and the respective controller. The bus data may furthermore comprise data transmitted by the bus subscriber, such as input process data. The respective communication data may furthermore comprise data transmitted by the respective controller, such as output process data.

A redundant control of the bus subscriber can be enabled due to the redundant connection of the respective controllers to the automation device 100. For example, the first controller is a primary controller and the second controller a backup controller. In the event of a failure of the first communication network, for example due to a cable break, a power failure or network overload, or in the event of a malfunction of the first controller, the bus subscriber can still be controlled here by means of the second controller. The switchover from the first controller to the second controller can be carried out in an automated manner. To do this, the first controller and the second controller may have a communication connection and may be configured to exchange status information relating to the control of the bus subscriber. According to one embodiment, the switchover from the first controller to the second controller can furthermore be carried out manually by a user of the respective controllers, for example by means of user interfaces of the respective controllers.

Figure 2:
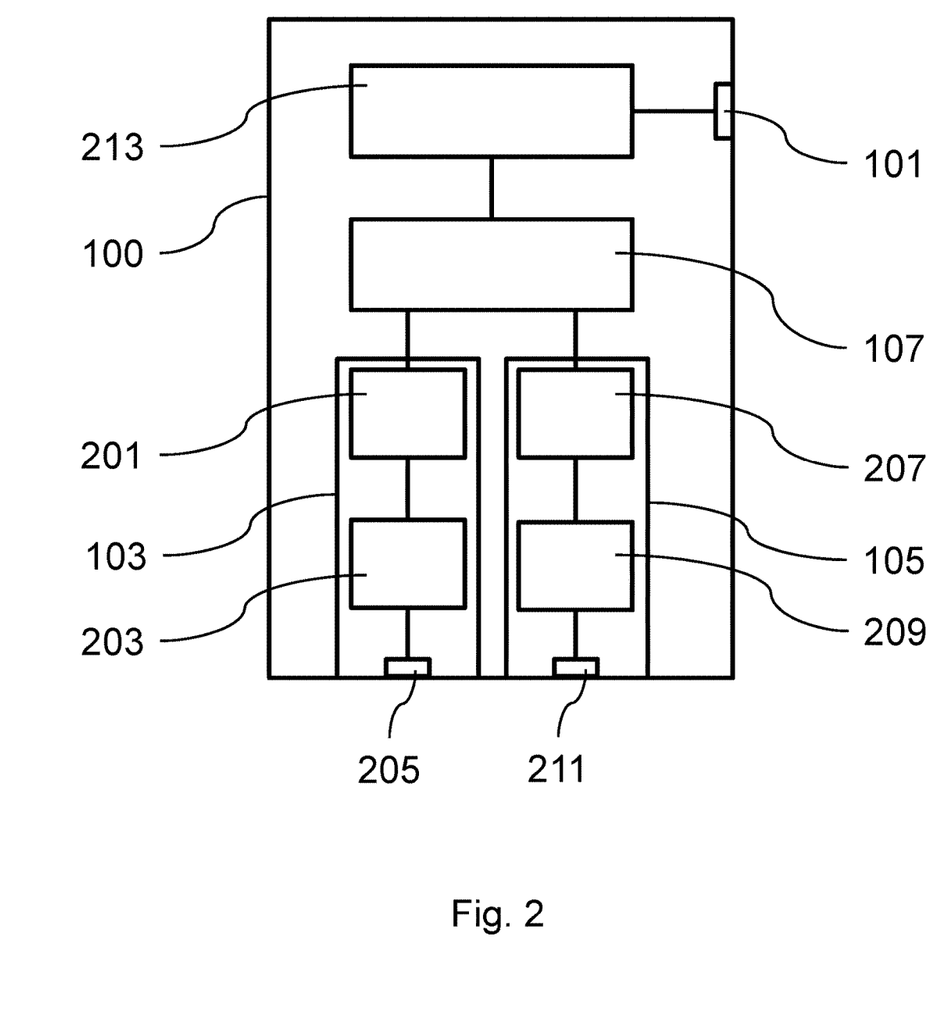
FIG. 2 shows a schematic diagram of an automation device according to a further embodiment.

FIG. 2 shows a schematic diagram of the automation device 100 according to a further embodiment. The automation device 100 comprises the bus interface 101, the first communication interface 103, the second communication interface 105 and the processor 107. Here, the first communication interface 103 has a first network controller 201, a first network interface 203 and a first network connection interface 205, wherein the first network controller 201 is configured to control the first network interface 203. The second communication interface 105 furthermore has a second network controller 207, a second network interface 209 and a second network connection interface 205, wherein the second network controller 207 is configured to control the second network interface 209. The automation device 100 furthermore comprises a bus controller 213 to control the bus interface 101.

A redundant, at least dual, design of the network infrastructure is frequently required for control systems in shipbuilding. In order to integrate the automation device 100, for example a modular remote I/O station, into an infrastructure of this type in a simple manner, said device can be designed with the first network interface 203 and the second network interface 209. No communication connection exists here between the respective network interfaces 203, 209, i.e. no network distributor, such as an Ethernet switch, is integrated into the automation device 100. The respective network interfaces 203, 209 operate with individual MAC addresses and individual network addresses, for example IP1 and IP2. The core of the automation device 100 is the processor 107, such as a processor unit which is physically connected via the respective network controllers 201, 207, such as MAC units, to the respective communication networks, such as two network media. The processor 107 is connected via the bus controller 213, such as a backplane bus controller, to the bus interface 101, such as a backplane bus interface. The processor 107 acts as a converter between the bus subscribers which are connected via the bus interface 101 and one or more controllers, such as automation devices or programmable logic controllers (PLC), which are connected via the respective network connection interfaces 205, 211. Bidirectional access is possible. The redundant design of the network infrastructure allows communication with the automation device 100 even if one of the respective communication networks fails, for example due to a cable break, power failure or network overload.

Figure 3:
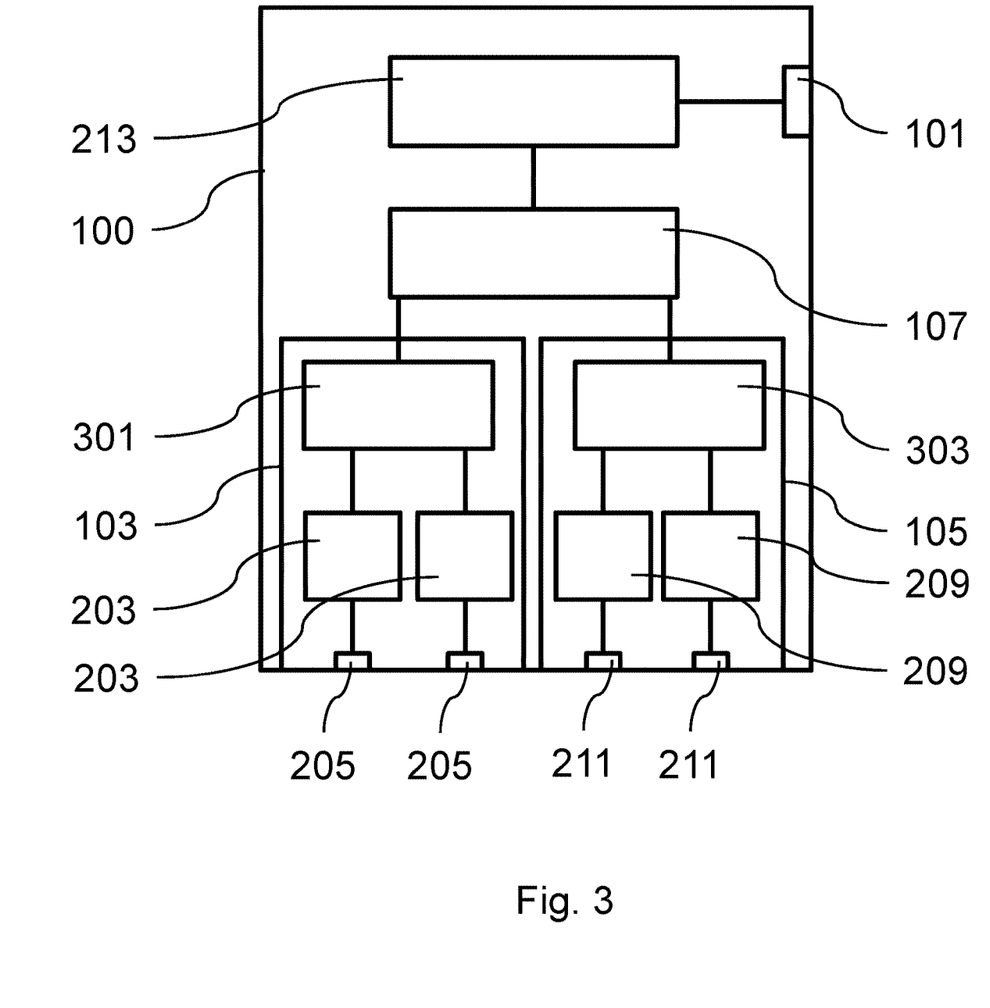
FIG. 3 shows a schematic diagram of an automation device according to a further embodiment.

FIG. 3 shows a schematic diagram of the automation device 100 according to a further embodiment. The automation device 100 has the bus interface 101, the first communication interface 103, the second communication interface 105, the processor 107 and the bus controller 213. Here, the first communication interface 103 has a first network distributor 301, two first network interfaces 203 and two first network connection interfaces 205, wherein the first network distributor 301 is configured to control the first network interfaces 203. The second communication interface 105 furthermore has a second network distributor 303, two second network interfaces 209 and two second network connection interfaces 211, wherein the second network distributor 303 is configured to control the second network interfaces 209. According to one embodiment, the respective network distributor 301, 303 can be formed by a switch.

Figure 4:
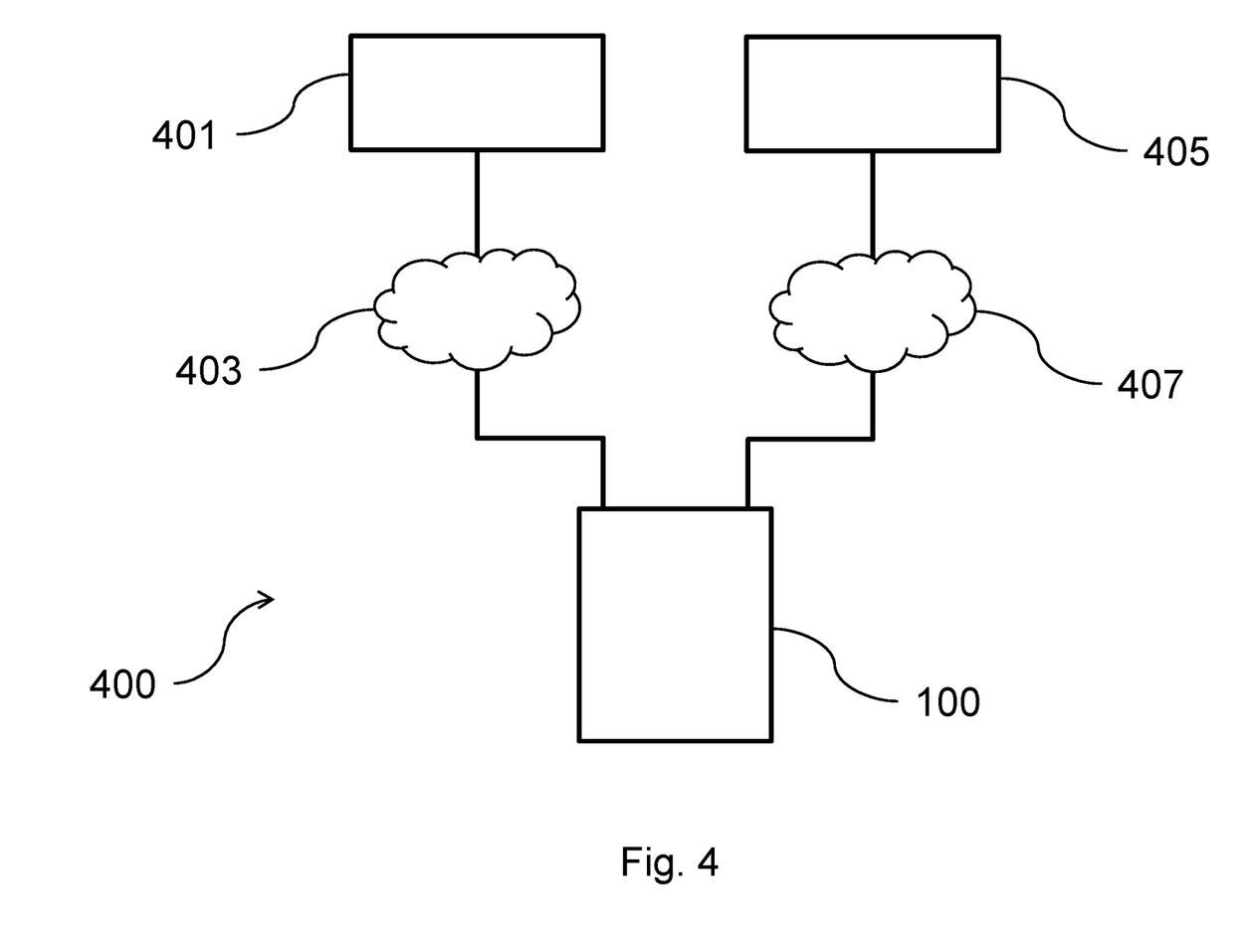
FIG. 4 shows a schematic diagram of a system for the redundant control of a bus subscriber according to one embodiment.

FIG. 4 shows a schematic diagram of a system 400 for the redundant control of a bus subscriber according to one embodiment. The system 400 comprises the automation device 100, a first controller 401 which has a communication connection via a first communication network 403 to the automation device 100 and a second controller 405 which has a communication connection via a second communication network 407 to the automation device 100.

The system 400 for the redundant control of a bus subscriber is configured with: the automation device 100 which is connectable via the bus interface 101 to the bus subscriber; the first controller 401 to control the bus subscriber, wherein the first controller 401 has a third communication interface for communication with the first communication interface 103 of the automation device 100 via the first communication network 403; and the second controller 405 to control the bus subscriber, wherein the second controller 405 has a fourth communication interface for communication with the second communication interface 105 of the automation device 100 via the second communication network 407.

The communication interfaces of the respective controllers 401, 405 may in each case comprise a serial interface, a parallel interface, an Ethernet communication interface and/or a Wireless Local Area Network communication interface. The respective communication network 403, 407 may furthermore be a computer network, an Ethernet network or an Internet Protocol network. The respective communication network 403, 407 may furthermore have a ring topology, a line topology or a star topology.

The respective controller 401, 405 may be a programmable logic controller. The respective controller 401, 405 may furthermore have a user interface for controlling the bus subscriber. For example, the first controller 401 is a primary controller and the second controller 405 is a secondary controller or a backup controller. According to one embodiment, the respective controllers 401, 405 can be combined into one control unit.

Figure 5:
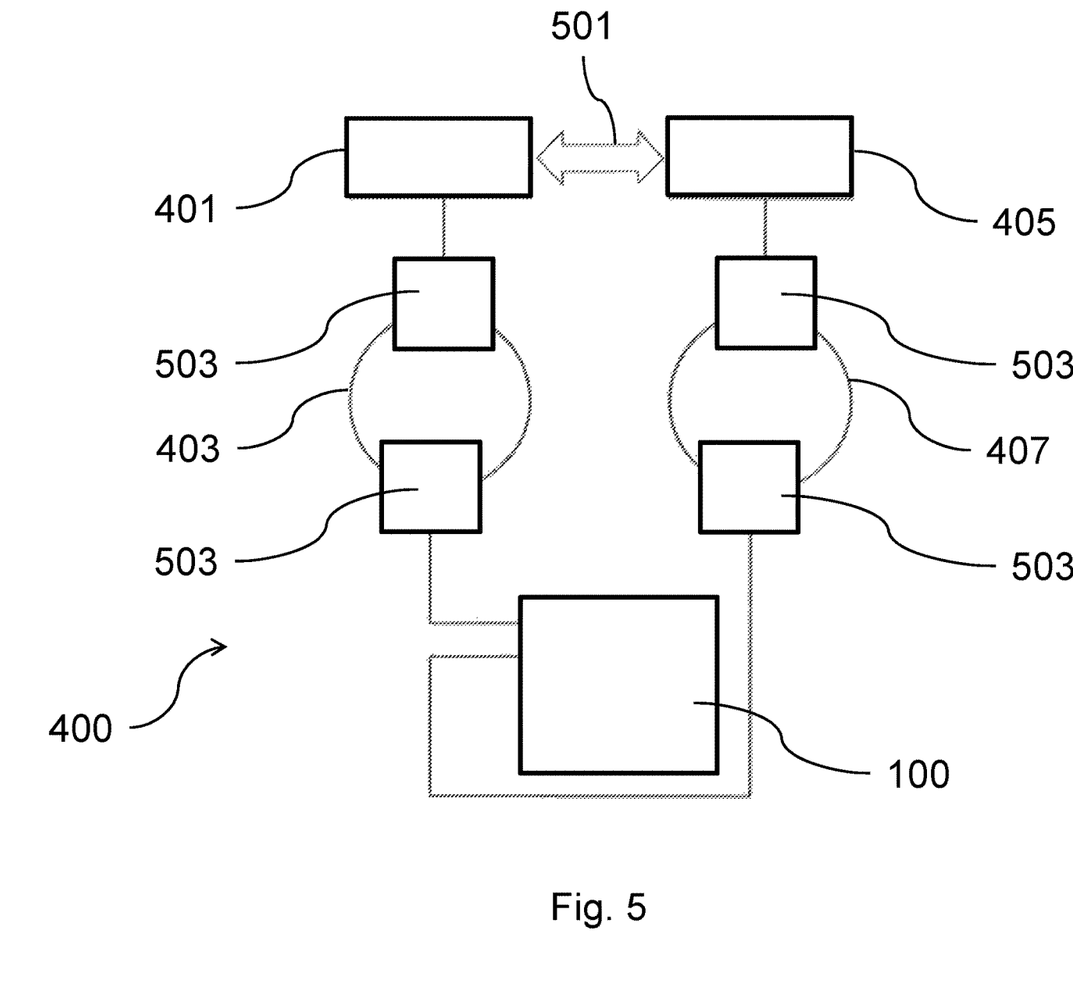
FIG. 5 shows a schematic diagram of the system for the redundant control of a bus subscriber according to a further embodiment.

FIG. 5 shows a schematic diagram of the system 400 for the redundant control of a bus subscriber according to a further embodiment. The system 400 has the automation device 100, the first controller 401 and the second controller 403. Here, the first controller 401 and the second controller 403 are connected via a communication connection 501. The automation device 100 and the first controller 401 are furthermore integrated in each case into the first communication network 403 via an external network distributor 503. The automation device 100 and the second controller 405 are furthermore integrated in each case into the second communication network 407 via an external network distributor 503. Here, the respective communication network 403, 407 in each case has a ring topology. The respective communication network 403, 407 may furthermore be a communication network according to the Internet Protocol standard.

The automation device 100 operates in the respective communication networks 403, 407 with two IP addresses which in each case differ from one another in terms of the network component, wherein a respective controller 401, 405, is located in the respective communication network 403, 407. The automation device 100, such as a bus coupler, provides both controllers 401, 405 with the input process data of the bus subscribers or backplane bus subscribers and operates in the output direction according to the "last in, first out" principle. The two controllers 401, 405 may be synchronized with one another via the communication connection 501 so that the automation device 100 receives output process data from the second controller 405, such as a backup controller, only if the first controller 401, such as a primary controller, has failed. However, the automation device 100 does not check or monitor this. The respective controllers 401, 405 may also be combined into one unit. A ring topology of the respective communication networks 403, 407 is shown by way of example in FIG. 5, but a line or star topology is alternatively also implementable. If a plurality of automation devices 100 are connected to the respective controllers 401, 405, as shown in FIG. 5, external network distributors 503 can be used.

Figure 6:
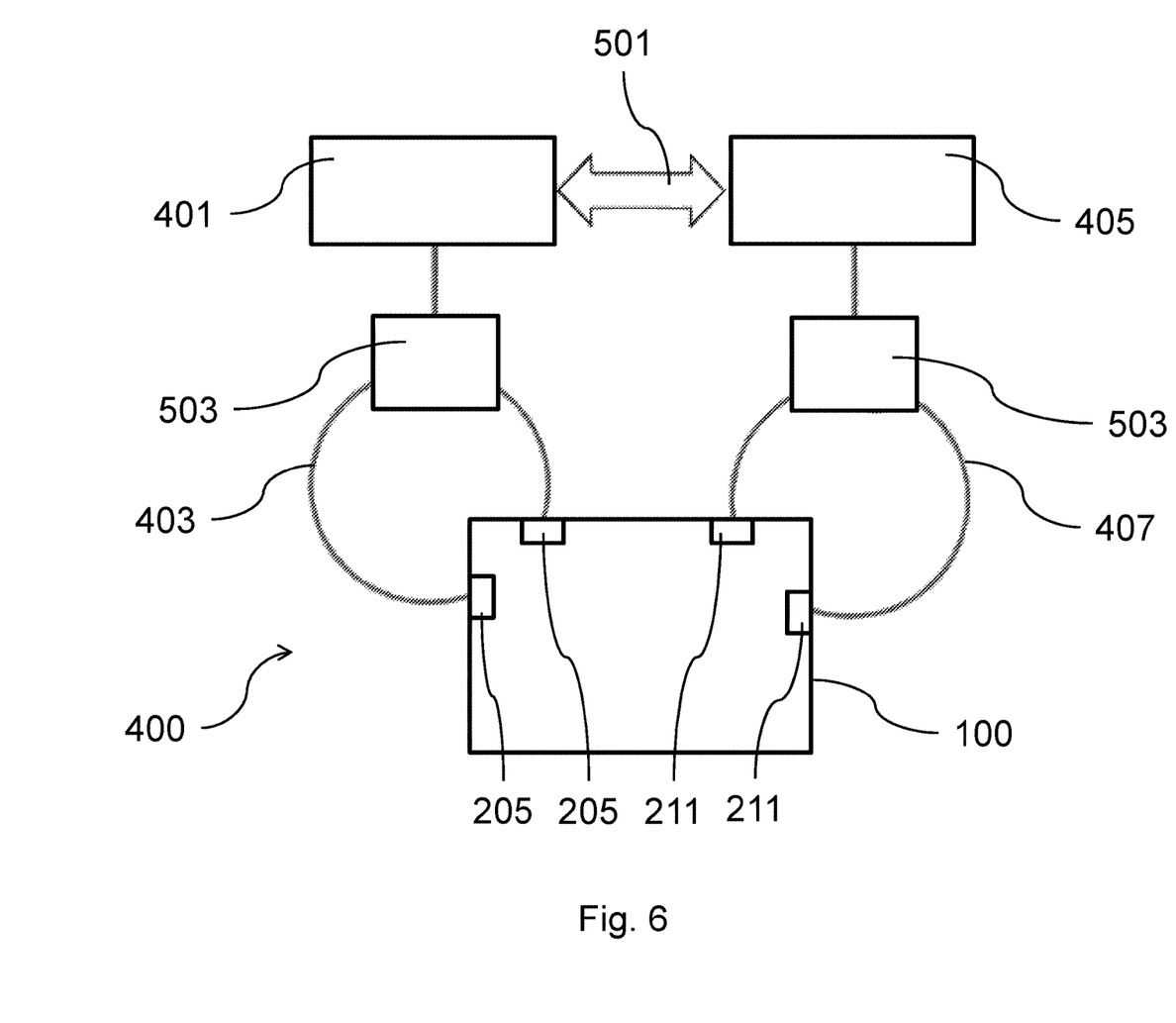
FIG. 6 shows a schematic diagram of the system for the redundant control of a bus subscriber according to a further embodiment.

FIG. 6 shows a schematic diagram of the system 400 for the redundant control of a bus subscriber according to a further embodiment. The system 400 comprises the automation device 100 according to the embodiment of the automation device 100 shown in FIG. 3. In contrast to the embodiment of the system 400 shown in FIG. 5, the automation device 100 is integrated into the first communication network 403 via two first network interface connections 205 and into the second communication network 407 via two second network connection interfaces 211.

Due to the facility for direct integration into two separate communication networks 403, 407 which may be configured in each case in a line or ring topology, two external network distributors 503 can be dispensed with. A ring topology is shown by way of example in FIG. 6, but a line or star topology is alternatively also implementable, wherein, in the case of a star topology, the embodiments of the automation device 100 shown in FIGS. 1 and 2 can also be used without the respective network distributors 301, 303.

According to one embodiment, two separate MAC addresses can be allocated to the respective communication interfaces 103, 105 or to the respective network interfaces 203, 209. A network distributor integrated into the automation device 100 can be dispensed with here, since no forwarding of data packets between the connected communication networks 403, 407 is provided, which represents the core task of a network distributor, such as an Ethernet switch.

According to a further embodiment, no emulation or conversion of MAC addresses is carried out by means of the automation device 100, but rather a direct allocation of individual MAC and IP addresses to the respective network interfaces 203, 209. A "central" third MAC address which is converted to the two other addresses can be dispensed with here.

According to a further embodiment, the respective network interfaces 203, 209, are always active. In the event of failure of one of the respective network interfaces 203, 209 or the connected communication networks 403, 407, no special action is carried out to activate the respective other network interface 203, 209.

According to a further embodiment, in the event of a failure of the actively used communication network, for example the first communication network 403, a fallback to the other communication network, for example to the second communication network 407, is possible. For this purpose, the respective controller 401, 405 can now access the automation device 100 with an IP address 2 and no longer with an IP address 1. The network messages can therefore be adapted.

According to a further embodiment, the respective network interfaces 203, 209 can be allocated in each case to one or more virtual networks, such as one or more Virtual Local Area Networks (VLAN).

According to a further embodiment, the processor 107 can be configured to run firmware in order to provide the functionality described above of the processor 107.

All features explained and shown in connection with the individual examples of the principles described herein can be provided in different combinations in the subject-matter according to the invention in order to simultaneously implement their advantageous effects.

REFERENCE NUMBER LIST

100 Automation device
101 Bus interface
103 First communication interface
105 Second communication interface
107 Processor
201 First network controller
203 First network interface
205 First network connection interface
207 Second network controller
209 Second network interface
211 Second network connection interface
213 Bus controller
301 First network distributor
303 Second network distributor
400 System
401 First controller
403 First communication network
405 Second controller
407 Second communication network
501 Communication connection
503 External network distributor

What is claimed is:

1. An automation device for redundant control of a bus subscriber, comprising:
a bus interface for communication with the bus subscriber;
a first communication interface for communication with a first controller via a first communication network;
a second communication interface for communication with a second controller via a second communication network; and
a processor, wherein the processor is configured to transmit bus data received from the bus interface to the first communication interface and to the second communication interface;
wherein the first communication interface is configured to transmit the received bus data to the first controller, wherein the second communication interface is configured to transmit the received bus data to the second controller, and wherein the first communication interface and the second communication interface are communicatively separated;

wherein the processor is configured to transmit first communication data received via the first communication interface and second communication data received via the second communication interface to the bus subscriber via the bus interface;

wherein the first communication interface and the second communication interface are configured to transmit the received bus data simultaneously to the first controller and to the second controller;

wherein a first MAC address is permanently allocated to the first communication interface and a second MAC address is permanently allocated to the second communication interface, the first communication interface is configured to communicate with the first communication network using the first MAC address, and the second communication interface is configured to communicate with the second communication network using the second MAC address;

wherein the first controller is configured to detect a communication error in a communication between the first controller and the automation device and to transmit a notification of a detection of the communication error to the second controller responsive to the detection of the communication error; and wherein the second controller is configured to control the bus subscriber responsive to receiving the notification of the detection of the communication error.

2. The automation device according to claim 1, wherein the first communication interface comprises a first network interface for communication via the first communication network and a first network controller to control the first network interface, and wherein the second communication interface comprises a second network interface for communication via the second communication network and a second network controller to control the second network interface.

3. The automation device according to claim 1, wherein the first communication interface comprises a plurality of first network interfaces for communication via the first communication network and a first network distributor to control the plurality of first network interfaces, or wherein the second communication interface comprises a plurality of second network interfaces for communication via the second communication network and a second network distributor to control the plurality of second network interfaces.

4. The automation device according to claim 3, wherein the first communication interface comprises a first Ethernet communication interface or wherein the second communication interface comprises a second Ethernet communication interface.

5. The automation device according to claim 3, with a bus controller to control the bus interface.

6. The automation device according to claim 3, wherein the bus interface is a backplane bus interface.

7. A system for redundant control of a bus subscriber, comprising:
   a first controller configured to control the bus subscriber;
   a second controller configured to control the bus subscriber; and
   an automation device, comprising:
      a bus interface for communication with the bus subscriber;
      a first communication interface for communication with the first controller via a first communication network;
      a second communication interface for communication with the second controller via a second communication network; and
      a processor, wherein the processor is configured to transmit bus data received from the bus interface to the first communication interface and to the second communication interface;

wherein the first communication interface of the automation device is configured to transmit the received bus data to the first controller, wherein the second communication interface is configured to transmit the received bus data to the second controller, and wherein the first communication interface and the second communication interface are communicatively separated;

wherein the processor of the automation device is configured to transmit first communication data received via the first communication interface and second communication data received via the second communication interface to the bus subscriber via the bus interface;

wherein the first controller has a third communication interface for communication with the first communication interface of the automation device via the first communication network;

wherein the second controller has a fourth communication interface for communication with the second communication interface of the automation device via the second communication network;

wherein the first communication interface and the second communication interface are configured to transmit the received bus data simultaneously to the first controller and to the second controller;

wherein a first MAC address is permanently allocated to the first communication interface and a second MAC address is permanently allocated to the second communication interface, the first communication interface is configured to communicate with the first communication network using the first MAC address, and the second communication interface is configured to communicate with the second communication network using the second MAC address;

wherein the first controller is configured to detect a communication error in a communication between the first controller and the automation device and to transmit a notification of a detection of the communication error to the second controller responsive to the detection of the communication error; and wherein the second controller is configured to control the bus subscriber responsive to receiving the notification of the detection of the communication error.

8. The system according to claim 7, wherein the first communication interface and the third communication interface or wherein the second communication interface and the fourth communication interface are Ethernet communication interfaces.

9. The system according to claim 7, wherein the first communication interface and the third communication interface or wherein the second communication interface and the fourth communication interface are configured to communicate using the Internet Protocol.

10. The system according to claim 7, wherein the first controller and the second controller are communicatively connected to each other, and wherein the first controller and the second controller are configured to exchange status information relating to the control of the bus subscriber.

11. A method for redundant control of a bus subscriber, comprising:

receiving bus data from a bus interface, wherein the bus interface is in communication with the bus subscriber;

transmitting the bus data to a first communication interface and a second communication interface, wherein:
- the first communication interface is configured to transmit the received bus data to a first controller via a first communication network;
- the second communication interface is configured to transmit the received bus data to a second controller via a second communication network;
- the first communication interface and the second communication interface are communicatively separated; and
- the first communication interface and the second communication interface are configured to transmit the received bus data simultaneously to the first controller and to the second controller;

receiving first communication data via the first communication interface and second communication data via the second communication interface;

transmitting the first communication data and the second communication data to the bus subscriber via the bus interface;

permanently allocating a first MAC address to the first communication interface and a second MAC address to the second communication interface, the first communication interface is configured to communicate with the first communication network using the first MAC address, and the second communication interface is configured to communicate with the second communication network using the second MAC address;

detecting, by the first controller, a communication error in a communication between the first controller and the automation device;

transmitting, by the first controller, a notification of detecting the communication error to the second controller responsive to the detecting the communication error; and controlling, by the second controller, the bus subscriber responsive to receiving the notification of the detecting the communication error.

12. The method of claim 11, wherein the first communication interface comprises a plurality of first network interfaces for communication via the first communication network and a first network distributor to control the plurality of first network interfaces, or wherein the second communication interface comprises a plurality of second network interfaces for communication via the second communication network and a second network distributor to control the plurality of second network interfaces.

13. The method of claim 11, wherein the first communication interface comprises a first Ethernet communication interface or wherein the second communication interface comprises a second Ethernet communication interface.

14. The method of claim 11, wherein the bus interface is a backplane bus interface.

* * * * *